United States Patent [19]

Lois

[11] 4,373,514
[45] Feb. 15, 1983

[54] DEVICE FOR COLLECTING, TRANSMITTING AND USING SOLAR ENERGY

[76] Inventor: Lambros Lois, 6104 Dunleer Ct., Bethesda, Md. 20034

[21] Appl. No.: 136,612

[22] Filed: Apr. 2, 1980

[51] Int. Cl.³ .............................................. F24J 3/02
[52] U.S. Cl. .................................. 126/438; 126/449; 126/452
[58] Field of Search .............. 126/438, 417, 451, 450, 126/452, 449; 350/258, 259, 260, 261, 262, 265, 264, 81, 69, 84; 33/DIG. 21

[56] References Cited

U.S. PATENT DOCUMENTS

| 247,229 | 9/1881 | Wheeler . |
| 507,999 | 11/1893 | Davis . |
| 668,404 | 2/1901 | Hanneborg . |
| 2,022,144 | 11/1935 | Nicolson ............... 350/264 X |
| 3,157,089 | 11/1964 | Menefee ............... 350/258 |
| 3,511,559 | 5/1970 | Foster . |
| 3,869,199 | 3/1975 | Cummings ............. 126/440 |
| 3,897,637 | 8/1975 | Genho .............. 33/DIG. 21 |
| 3,902,056 | 8/1975 | Aizenberg et al. ......... 350/264 X |
| 4,078,547 | 3/1978 | Malecek . |
| 4,246,477 | 1/1981 | Latter .............. 350/262 X |

FOREIGN PATENT DOCUMENTS

5285 3/1901 Austria ................. 350/264

Primary Examiner—Larry Jones
Attorney, Agent, or Firm—Millen & White

[57] ABSTRACT

A solar energy system is provided whereby solar energy which has been collected, concentrated and collimated is transmitted through a unique transmitter device to a solar energy storage or utilization device. The transmitter comprises modular tubes with highly reflective and smooth walls. Each tube is provided with alignment means such as alignment sights. Bent tubes additionally have, e.g., mirrors positioned at the bent sections to aid in alignment, whereby the total number of reflections made by the beam is minimized and the transmission of the entire system is maximized. Sufficient solar energy is thereby provided to operate, inter alia, water heaters, space heaters, small power plants, stoves, etc. with minimal disruption of existing facilities.

17 Claims, 10 Drawing Figures

DEVICE FOR COLLECTING, TRANSMITTING AND USING SOLAR ENERGY

BACKGROUND OF THE INVENTION

The present invention relates to a device for collecting, transmitting, storing and/or using solar energy and particularly to a device for transmitting collected solar radiation which has been concentrated and collimated.

Many solar energy collection devices are known. Most of these, especially the commercial ones, collect solar energy by absorption of the same by a circulating liquid system, e.g., water or water/antifreeze. The thus-heated fluid is, e.g., used to heat a household water supply. Such systems require extensive plumbing which, especially in retrofitting applications, is inconvenient and expensive.

In contrast to such familiar systems wherein a fluid is taken to the solar radiation, e.g., outside a house and the captured heat circulated into the house, there have also been suggested systems wherein the solar radiation per se is directed inside a structure to an existing energy using device. Such systems comprise three elements, a solar collector, a transmitting component and a utilization device. Such systems and components are disclosed, e.g., in U.S. Pat. Nos. 3,511,559, 4,139,286, 3,955,554, 4,018,212, 4,068,474, 3,070,643, 507,999, 3,297,958, 3,217,702, 3,713,727, 3,379,394, 3,391,688, 3,780,722, 4,026,267, 4,078,547, 247,229 and 668,404. However, such systems have not achieved practical significance. One reason for this is the prior art failure to realize the criticality of transmission and other losses along the optical path followed by the collected solar radiation. For example, on page 6 of U.S. Pat. No. 247,229, low collimation, many reflections and high dispersion of the transmitted radiation is preferred. Similar disclosures are also made in U.S. Pat. No. 668,404 (column 1, lines 29-37) and U.S. Pat. No. 4,078,547 (column 2, lines 31-39).

SUMMARY OF THE INVENTION

It is an object of this invention to provide a system for collecting, transmitting and storing and/or using solar energy.

It is another object of this invention to provide such a system and a transmitting device wherein the amount of collected solar energy reaching the end storage or utilization device is maximized.

It is a further object of this invention to provide such a system and device which are readily adaptable at low cost to existing structures, such as office buildings, homes, etc., and energy utilization devices with minimal retrofitting.

It is still a further object of this invention to provide a system wherein the spectral distribution and intensity of the sun's radiation are accounted for in combination with the energy requirements of energy utilization devices, so that the amount of solar radiation reaching the latter is sufficient for satisfactory operation.

Upon further study of the specification and appended claims, further objects and advantages of this invention will become apparent to those skilled in the art.

These and other objects of this invention have been attained by providing, in one aspect of this invention, a transmission device for transmitting a beam of collimated solar energy from a solar energy collector-concentrator-collimator to an associated solar energy utilization device, said beam having a propagation axis defined by the line formed by the center of said beam along its direction of travel, said device comprising:

a plurality of modular, interconnected solar energy transmission tubes, said plurality of tubes having a transmission axis defined by the interconnection of the longitudinal axes of said tubes, each tube having smooth walls highly reflective to solar radiation, at least one tube being an angled tube wherein the walls thereof form an angle at at least one position thereof whereby the longitudinal axis of said angled tube is changed in direction by the same angle at said position; and said angled tube having an interior beam diverting means located inside at said position, whereby the direction of radiation propagating along the longitudinal axis of said angled tube is changed by said angle of said position, and each non-angled tube having a sight disposed on its exterior at each end such that a line drawn through the center of said sights will be parallel to the longitudinal axis of said tube, and each angled tube having a sight disposed on its exterior at each end and also having an external beam diverting means disposed on its exterior at the position of said angle such that light propagating parallel to the longitudinal axis of one side of said angled tube and passing through the sight disposed on the end of the same side of the angled tube will be diverted at said external beam diverting means to propagate along a direction parallel to the longitudinal axis of the other side of said angled tube and pass through the sight disposed at the end of said other side; said sights providing means by which said longitudinal axis of said plurality of tubes can be aligned to essentially coincide with said beam propagation axis.

In another aspect, these objects have been attained by providing a solar energy system comprising:

a solar energy collector;

means for concentrating the solar energy collected by said solar collector;

means for collimating the solar energy collected by said solar collector, the transmission device described above by which solar energy collected, concentrated and collimated by said collector, concentrator and collimator means can be efficiently transmitted to a solar energy end use device; and a solar energy use device.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 illustrates the device and system of this invention;

FIG. 1a is a cross-sectional view of the device of FIG. 1 taken along section line 1a—1a;

DETAILED DISCUSSION

The solar energy system of this invention comprises a solar energy collector/concentrator/collimator, a solar energy transmitter, a solar energy storage or utilization device and means for aligning each of these individual elements to form an overall aligned system. The latter is especially important in view of one of the key concepts upon which this invention is based, i.e., of minimizing the number of reflections when the transmitted solar beam undergoes during its passage from the collector/concentrator/collimator through the transmitter into the utilization device. This requirement necessitates good collimation, good alignment and, concomitantly, very high reflectivity and smoothness for each of the surfaces with which the solar beam can come into contact, especially the walls of the modular transmitter.

The first element in the system of this invention is the collector/concentrator/collimator. This element can comprise a single conventional device which performs all three functions or can comprise three or more separate devices which individually perform part or all of each function. Its purpose is to collect the radiation from the sun which impinges on its surface and convert the same into a collimated beam of a similar diameter which can be transmitted in the transmitter tube. Various lens and/or mirror systems which can accomplish these collection/concentration/collimation functions are per se conventional. See, for example, U.S. Pat. No. 4,139,286 which discloses a solar collector/concentrator/collimator which also has the capability of tracking the sun throughout its daytime path. Tracking can also be accomplished using time-clock mechanisms or, e.g., two-dimensional arrays of photosensitive devices for determining the sun's position with an attendant feedback control mechanism.

The collector area should be selected in accordance with the energy requirements for a particular utilization device and the solar intensity in the geographical region of interest, generally up to 1.9 kw/m$^2$, as affected by the geographical climate, desired periods of use during a year, typical usage periods during a day, etc. In general, collector areas of approximately 1-3 m$^2$ will suffice for a number of household applications. As an example of the usefulness of such readily achievable collector areas, it should be considered that a typical electrical cooking unit has a power rating of less than or about 1 kw. Accordingly, a collector of an area of about 1 m$^2$ could supply sufficient energy to replace or supplement the conventional energy supply of such a cooking unit depending on time, location and conditions. Other conventional energy using devices have similar ratings, i.e., in the few kilowatt range, e.g., normal hot water heaters, space heaters and many other devices, some of which are discussed below. Collectors having effective areas in the mentioned range could capture sufficient solar radiation to provide the energy requirements for a wide range of such existing devices with, using this invention, minimum interruption of their existing environment.

The degree of beam concentration effected in this component of the system is also not critical. Factors of convenience, cost, commercial availability of components, etc. will be prime considerations in this regard. Generally, the concentrated beam diameters will be in the range of a few cm.

The particular design of the collector/concentrator/collimator is not critical. Systems using lenses, mirrors or combinations thereof are all suitable. Preferably, all surfaces are appropriately treated so that the transmission of this component of the system is maximized, e.g., lenses should be coated with anti-reflection coatings, reflective surfaces should have maximal reflectivities and smoothness, etc. Larger components may be of unitary construction or can be of segmented design wherein several lenses or mirrors are so situated as to act as a single large lens or mirror. Non-limiting, exemplary systems include lens systems wherein a large collecting lens is situated with respect to the focal point of a smaller collimating lens such that the outgoing concentrated and collimated beam is of the required smaller diameter than the incoming beam of parallel solar radiation. Similarly, combinations of parabolic mirrors and collimating lenses can be utilized wherein the sizes and focal lengths are selected and the components situated such that the appropriate size reduction of the beam of the incoming solar radiation is effected.

Typical optical systems are described in any of the large number of basic texts on optics, e.g., *University Physics* by Sears et al (Addison Wesley 1964); *Modern Optics* by Brown (Reinhold 1966); *Optics* by Klein (Wiley 1970). For example, a large double convex lens can be employed as the objective. At the focal point thereof can be located a much smaller diameter coaxial double concave lens of appropriate focal length such that a collimated beam ensues. Aberrations can be corrected in fully conventional fashion, e.g., using converging/diverging lens doublets of appropriate indices of refraction.

As mentioned, the purpose of the transmitter of this invention is to transmit the collimated and reduced beam emanating from the first component to the receiving component, i.e., the solar energy utilization device or storage unit. The design of this component, as well as the way in which it is interconnected with the remainder of the system, is a critical feature of this invention.

The primary requisites for the transmitter are that it be able to house the collimated beam developed in the first component of the system, transmit it with minimal energy loss due to absorption, reflection, etc. to the energy storage or utilization device, bend the collimated beam through preselected angles, again without significant loss, and, most importantly, afford the capability of alignment with respect to all other components of the system and the axis of propagation of the collimated beam as well as of the individual modular sections of the transmitter per se.

The transmitter is most conveniently composed of interconnected modular tubes having inner surfaces of very high reflectivity and smoothness. Such tubes can be in straight lengths or in pre-formed angles of predetermined values. Such bent tubes will contain optical elements such as highly reflective mirrors or suitable prisms whereby a collimated beam of radiation propagating down the longitudinal tube axis of one side of the angle will be reflected at the optical element by an angle which is the same as that through which the tube is bent. Thereby, the optical axis of the propagating collimated beam will coincide with the longitudinal tube axis at the other end of the tube, i.e., the beam propagation axis will be bent by the same angle by which the tube is bent.

In general, the diameter of each of the modular tubes will be slightly larger than that of the collimated beam, e.g., in the few cm. range, for example, 2–7 cm.

The importance of having very smooth and very highly reflective walls on the inside of the modular transmitter tubes can be seen from the following discussion and analysis.

The collimated solar beam which enters the transmitter cannot be perfectly collimated, especially in a system where costs are to be minimized; hence, a part of the beam will suffer multiple reflections before it reaches the point of utilization. It can be seen from an inspection of Table 1 below that the amount of energy remaining in the beam diminishes logarithmically as a function of the number of reflections. But if the reflectivity is in the neighborhood of 0.9 or lower, there is a very small number of reflections which the beam can undergo before it diminishes significantly. Hence, satisfactory operation of the transmitter requires good collimation and high reflectivity. In this regard, it is advantageous that the reflection will be at very small angles, i.e., glazing collisions which lose much less energy than collision of rays vertical to the reflective surface.

TABLE 1

PORTION OF BEAM REMAINING VS. THE NUMBER OF REFLECTIONS FOR DIFFERENT REFLECTIVITIES

| Reflectivity | Number of Reflections | | | | | | | |
|---|---|---|---|---|---|---|---|---|
| | 2 | 4 | 8 | 16 | 32 | 64 | 128 | 256 |
| .9 | .81 | .656 | .431 | .185 | .034 | .001 | 0 | 0 |
| .99 | .98 | .961 | .923 | .851 | .725 | .526 | .276 | .076 |
| .999 | .998 | .996 | .992 | .984 | .968 | .938 | .880 | .774 |

Fortunately, technology presently exists for fabricating the necessary, highly reflecting, modular transmitter of this invention. For example, the reflectivity of mirrors formed with evaporated metal films, e.g., silver, aluminum, gold, copper, etc., is for some wavelengths close to 0.98 or higher. Silver, for wavelengths greater than about 0.4 m, has a reflectivity close to 0.98. (Seen any textbook on optics, for example, J. Strong, *Concepts in Classical Optics*, W. H. Freeman & Co., San Francisco, 1958, p. 72.) Multiple layer mirrors formed with evaporated metal films can produce even higher reflectivities, e.g., higher than 0.99. The reflectivity obtained can be varied conventionally by varying the number of layers, the kind of vacuum used in deposition, the rapidity of depositing, etc. (See Encyclopedia of Science and Technology, McGraw Hill, Vol. 11, p. 421 (1977).)

In order to illustrate the practical significance of such high reflectivities in achieving a high degree of transmission efficiency, it will be assumed that the transmitter walls are coated with multiple layers of vapor deposited aluminum. The resultant reflectivity will be a function of the wavelength of the propagated radiation. For example, aluminum has a reflectivity of more than 0.9 for wavelengths of about 0.4 $\mu$m and larger. (See for example, "Mirror Optics", Encyclopedia of Science of Technology, McGraw Hill, Vol. 8, p. 598 (1977).) However, as the wavelength increases, the reflectivity also increases to values greater than 0.9. At shorter wavelengths, the reflectivity decreases. This is significant since these variations mesh well with variations in the solar intensity spectrum which is also very important in determining the operability of a given system.

The ultraviolet region of the solar spectrum (i.e., wavelengths less than 0.35 $\mu$m) contains only 8% of the solar radiation. The visible part (wavelengths of 0.35–0.7 $\mu$m) comprises 47% of the energy and the infrared region (wavelengths greater than 0.7 $\mu$m) contains 45% of the solar spectrum. Thus, the overwhelming amount of solar energy appears in wavelengths for which rather high values of reflectivity are readily achievable, i.e., close to or higher than 0.9, especially considering that mostly grazing reflections are involved.

At a further illustration, an example of a transmitter of 1 inch in diameter (d) can be considered. Therein, a grazing reflection will occur in a plane through the axis of the cylinder, e.g., of an angle of $\theta = 1.0°$. The relationship between the tube diameter (d) and the length of tube L over which the ray will traverse before another collision occurs, is L tan $\theta = d$, i.e., L is 4.8 ft. In a practical installation, the total length would be about 25 ft. (e.g., from a roof to a basement water heater). Hence, the number of reflections will be about 5. Adding another 5 mirror reflections which may be required to get the beam to its destination, there might be a total of about 10. If the reflectivity is 0.99, 90.4% of the beam will be transmitted. Thus, the portion of the beam which undergoes reflections will be hardly diminished. If the reflectivity is 0.98, the corresponding transmittance is 80.1%. For 0.90, it is 34.9 which means that the beam will be diminished significantly. The importance and criticality of the reflectivity to an efficient transmission system for a given number of reflections is clear. The required overall percentage transmission of the system will depend, *inter alia*, on the contemplated end use.

It is thus very important to maximize reflectivity and minimize the number of reflections which the beam undergoes. Of course, every surface which may come in contact with the radiation should also be smooth, e.g., the surfaces of all mirrors as well as the transmitter walls. This is especially important in the case of parabolic mirrors which might be used in the collector/collimator/concentrator system. Otherwise, the beam may not be well-collimated and a significant portion of the incident radiant energy will not be part of the collimated beam. This will increase that portion of transmitted solar energy which will undergo reflections during its travel to the utilization device.

Figures 1, 1A:
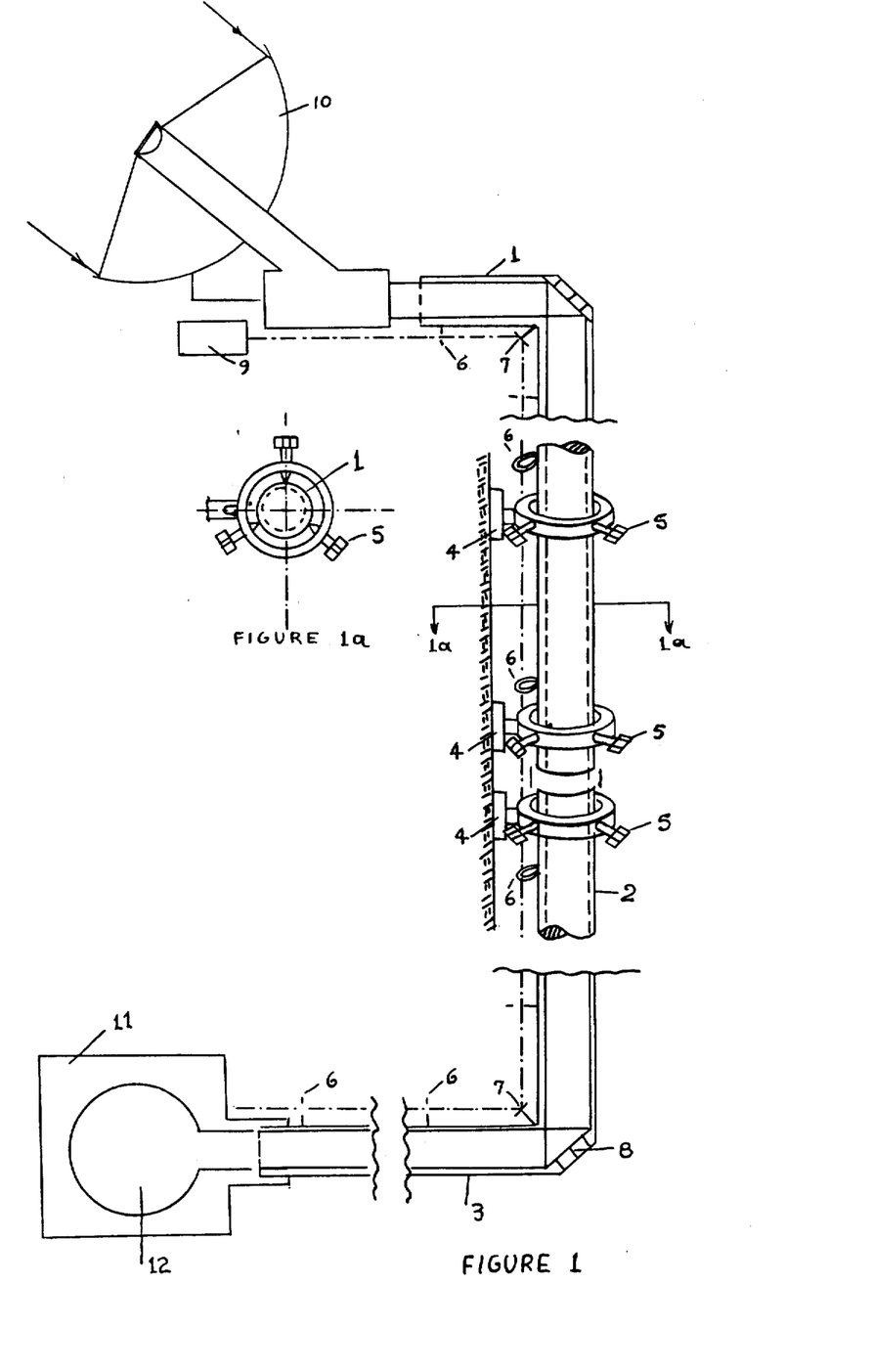

In order to achieve the foregoing requirements, i.e., to further ensure that the maximum amount of energy is contained in the collimated portion of the beam which will not undergo any unnecessary reflective collisions, good alignment throughout the system is necessary. In order to enable the attainment of the necessary alignment, each of the modular sections of the transmitter of this invention is provided with alignment means. For example, as shown in FIG. 1, each of the modular sections can be provided with at least two alignment sights 6 for which a line drawn between the centers thereof will be parallel to the longitudinal axis of each transmitter component as defined above. For bent components, this same requirement can be met, e.g., by providing an appropriately oriented optical device, e.g., a mirror 7 attached to the outside of the angular portion of the component in a plane parallel to that of the internal mirror 8. Preferably, such alignment means are permanent fixtures of each of the modular components.

Using such means in conjunction with, e.g. a small visible wavelength laser 9, the system of this invention can be conveniently and accurately aligned. With reference to FIG. 1, several interconnected segments 1, 2, 3 are used in a transmitter. Each is supported by a suitable wall or other structure through brackets 4. The brackets have alignment screws 5 to adjust the position of the transmitter with respect to the bracket. The laser is supported so that the direction of the beam coincides with the extrapolation of the axis defined by the center of the holes of the sights of the first segment 1. The following segments 2, 3, etc. are adjusted so that the laser beam passes through all the sights, hence assuring alignment of each subsequent segment.

Alignment could also be accomplished without the sights, e.g., by directly shining a laser over the optical path and suitably adjusting each component. However, the sights greatly facilitate a much more accurate alignment because the installer can intercept the beam on the outside of the transmitter and make the adjustments correctly, conveniently, quickly and accurately.

When the direct method is used, the collector and collimator have already been aligned to direct sunlight in the direction of the transmitter. In addition, at the time of the alignment, sunlight must be available. In this method, a screen (e.g., a piece of paper) is used to intercept the collimated beam passed through the transmitter. Alignment is assured and verified from the shape of the intercepted beam as described below for the passage of the laser through the entire system. For each modular component added to the transmitter, the test is repeated to assure alignment. The laser/alignment sights method is superior to this direct method in that it more readily permits realignment after installation, e.g., needed due to a significant disturbance, e.g., large temperature changes, earthquakes, etc.

The alignment of the collector 10 to the transmitter is done separately by any conventional technique and will depend heavily on the details of the collector. For example, the collector will have means for adjustment of its optical axis and also will provide for mounting of a small visible laser such that the laser beam impinges upon the collector in a direction parallel to that of the sun's rays. In following the optical path of the system, the laser beam will exit the collector/concentrator/collimator system and will pass through the first segment of the transmitter. It may be intercepted at the entrance of the first segment and also at the exit thereof. The optical pattern observed at both points should be similarly located with respect to the longitudinal axis of the first transmitter section. At each end there might appear, e.g., a round spot, depending upon the original image transmitted. The first step of alignment, thus, will often be the performance of the above procedure or some other conventional one by which the collector is aligned with the first segment of the transmitter. Subsequent modules can then be attached thereto and the previously described alignment procedure employed to assure overall system alignment.

As a final test, of course, the laser may be made to pass through the entire optical path of the system from the collector through the transmitter to the energy storage or utilization device 11. For example, the circular cross-section of the laser beam may be made to impinge upon the collector as described above in a direction parallel to the sun's rays. If the system is in good alignment, the image should be transferred with little aberration at the entrance of the energy storage or utilization device. The beam shape at this point may be conveniently determined by interception on a perpendicular surface such as a piece of paper. If a well-defined circle is not observed, e.g., if the spot is diffused or distorted, improper alignment will be indicated. Of course, this procedure can be used either at the time of original installation of the system or periodically as a maintenance operation. In order to facilitate this final overall alignment check, a device can be provided to ensure that the laser is directed parallel to the sun's rays. For example, the laser may be attached to a support. In turn, a tube may be attached to this support such that it is parallel to the laser beam. By ensuring that the tube is parallel to the sun's rays, e.g., by intercepting the sun's rays through the tube and optimizing the resultant image, the laser beam can be properly aligned.

In a preferred embodiment, the apparatus of this invention will include a small laser permanently mountable in several predetermined locations, e.g., to provide an appropriate impinging beam on the collector surface or to provide a beam which is colinear with the external sights on the first segment of the transmitter, etc. Suitably oriented mounts for the laser in each of these positions can be readily incorporated into the system.

The possibility of straight or bent transmitter components has been mentioned above, as has the feature of modular construction whereby various preconstructed modules are fit one into the other in order to construct the overall transmitter. Such modular construction will be conventional and will assure continuous smoothness of the interior walls of the transmitter.

Other possible variations of modular components can also be employed. For example, in certain systems, e.g., those requiring abnormally long transmitter paths, it may be necessary to refocus the beam, i.e., recollimate it as it travels along the transmitter. This can be accomplished, e.g., by incorporating suitable lenses in a single modular component which will then function as a refocusing/collimating segment.

Figure 5A:
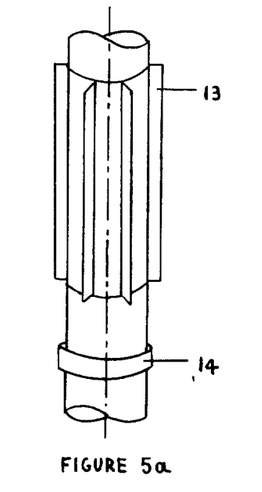
FIGS. 5a-e show various preferred embodiments of the modular tubes and end use devices used in this invention.
Figure 5B:
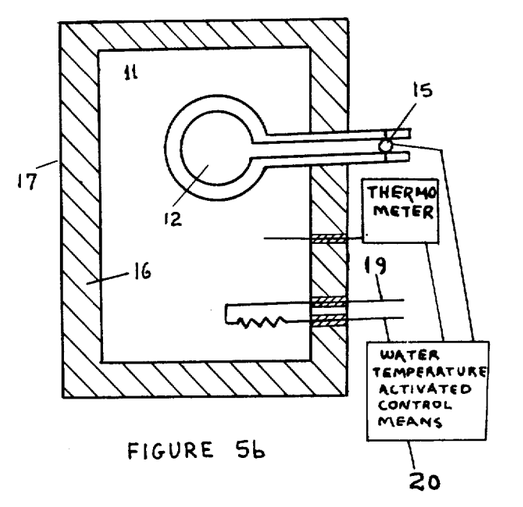
Figure 5C:
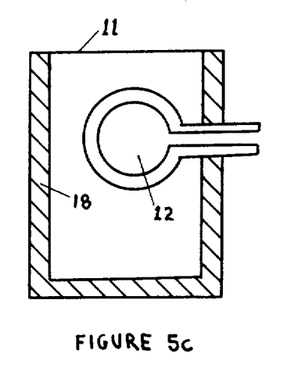

In certain applications, it may also be desirable to incorporate a "switch" in the system, i.e., to discontinue the flow of solar energy to the energy storage/utilization device when the collector would otherwise be transmitting solar power. Such a device could be provided in a single modular component wherein there is contained a highly reflective mirror or a similar plate 15 which, when positioned perpendicular to the solar beam, will turn the solar power off and when positioned out of the beam or, e.g., with its reflective surface parallel to the beam, will turn the solar power back on (FIG. 5b).

Each or some of the modular tubes can be suitably provided with a transparent, non-reflective (e.g., antireflection coated) plate or film to effectively seal each against dust and, perhaps, if constructed to hold a vacuum, also against air oxidation of the reflective surfaces where necessary. Also, surfaces can be coated with glass or plastic where suitable to provide similar protection as long as the beam transmission requirements of this invention are met. The tubes per se, of course, may be made of any suitable metal or glass and may have a conventional outer protective or insulative coating, if necessary, such as, for example, an asphalt or synthetic resin layer.

As mentioned, one embodiment of the bent modules incorporates a highly reflecting mirror at the bent portion of the tube such that the reflecting surface makes an angle $\theta$ with the optical axis of one part of the tube, thereby bending the optical axis by a value of $2\theta$. $\theta$ may be suitably chosen at any value necessary for a given installation.

In place of the highly reflective mirror, there may be used a totally reflecting prism, e.g., to bend the beam by an angle of 90°. As for the mirrors, prisms can be also used in conjunction with any angle. Details of construction and orientation of such totally reflecting prisms are conventional, see, e.g., *Modern Optics*, Brown, Reinhold Publishing Company, New York (1965), page 171. Another possibility is to employ a bent fiber optic bundle at the bent portion of the tube. Again, any practically required angle should be achievable by this technique. Because of the essential lack of dispersion effects and ease of design and installation, the reflecting mirror is the preferred embodiment for use in achieving bending of the solar beam.

As mentioned, the solar beam in concentrated form which emanates from the transmitter may be employed in any of a large number of storage or utilization devices 11. For example, a basic heat sink 12 for absorbing the transmitted radiation can comprise an enclosed cavity which simulates a black body, e.g., which has a highly absorbing black surface coated on the inside thereof. Such highly absorbing surfaces having low reflectivities are known. The absorbed radiation is transmitted through an opening in the generally circular cavity to the bulk material surrounding it, thereby heating the same and providing a surface from which the heat can be directly utilized or further transferred.

For example, such a basic heat sink cavity 12 can be constructed of a highly conductive metal such as copper, aluminum, silver, etc. The outside surface thereof can be constructed, e.g., with fins to aid in heat transfer from the metal body forming the cavity to, e.g., surrounding water 16 which may be the water in a water heater 17 in which the absorbing cavity is contained (FIG. 5b). One advantage of such a water heater is that the system of this invention can be readily retrofitted into existing plumbing facilities and water heaters without the need for additional plumbing. Of course, the same system could be used for energy storage if the water surrounding the heat sink cavity is subsequently used as a heat transfer medium.

The solar water heater can be designed with a supplemental heating unit 19 (e.g., gas or electricity) incorporated therein so that when heating is required but solar energy is not available, the conventional unit can take over the heating load (FIG. 5b). A control circuit 20 can be used to switch on or off both the conventional unit when necessary and the solar unit. For example, an electric resistive heating element can be controlled by switch D operated by a temperature activated circuit. The solar heating element can be controlled by a switch such as that described herein operated by a relay C, controlled by another temperature activated circuit B. The switch C is normally open, i.e., solar heat can reach the solar heating element S. If the temperature reaches a predetermined low range between, e.g., $T_1$ and $T_2$ ($T_2 > T_1$), the switch D will close, the resistive heating will be activated and the temperature will increase to a point in another predetermined range, e.g., between $T_2$ and $T_3$ ($T_3 > T_2$). Should the temperature exceed $T_3$ (or reach $T_3$) the circuit B will close switch C while switch D will remain open. In this manner whenever solar power is available it will heat the water, but if the demand is greater than the capability of the solar unit or if at the time sufficient solar radiation is not available, the resistive heating will be energized. On the other hand, if there is no demand for hot water and there is solar heat, the temperature will reach an upper limit $T_3$ and the switch C will close off the solar heating. An off switch can also be incorporated which will close C and open D independent of T and keep the heater in the off position.

Figure 5D:
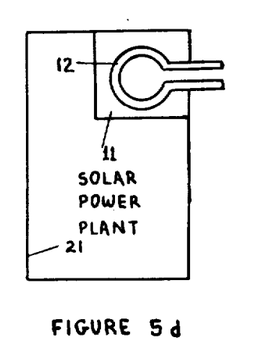
Figure 5E:
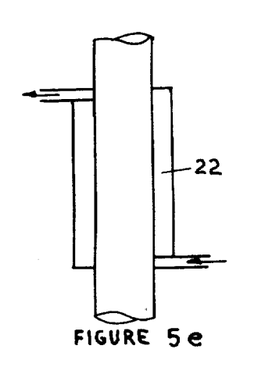

The same basic heat absorbing cavity of metallic construction can also be used to provide domestic cooking needs. This can be accomplished, e.g., by surrounding all sides of the external metal of the cavity with an insulating material 18 except for the top side through which essentially all of the absorbed heat will emanate (FIG. 5e). This side will thus provide a cooking plate which can be used to heat various cooking utensils. A conventional electrical or other heating unit can be incorporated in such a solar cooking unit (e.g., installed on top of the solar heating plate) to provide conventional cooking capability unless solar energy stored or on-line is not available. Similar dual capabilities can be incorporated in any of the solar utilization devices in conjunction, e.g., with conventional control and/or thermostating devices to render the non-solar mode operational when solar energy is not available.

In another embodiment, an absorbing cavity as described above, preferably with an elongated shape, can be provided with metallic heat transfer fins on the outside surfaces thereof in order to facilitate the heating of air, thereby providing space heating. That is, as in conventional forced air systems, the air in a closed environment can be made to circulate and pass over the heat transfer surfaces of the cavity which absorbs the transmitted solar power. The air becomes heated and provides warmth throughout the environment in its circulation. The heat transfer/absorbing cavity best suitable for such an end use can be readily designed using fully conventional considerations. In general, it will have a larger surface area and be longer than similar cavities used for heat transfer to cooking utensils or water.

Using the basic devices described above, ready adaptations may be constructed, e.g., for heating swimming pools, dessicant drying of agricultural or industrial products, greenhouse heating, fabrication of cooking ovens for baking, e.g., by introduction of the beam into an appropriately designed and insulated or absorptive wall space, space cooling, etc. at low cost and without special apparatus.

Since the visible portion of the solar spectrum is generally also transmitted using the system of this invention, it can also be used for illumination, e.g., of rooms or buildings having no or minimal outside lighting via windows. This may be accomplished, e.g., by introducing the beam from the transmitter into a polygonal prismatic or reflective component wherein the solar radiation gets dispersed in all directions throughout a room. (See, e.g., U.S. Pat. Nos. 247,229; 668,404; 3,511,559, inter alia). Such an arrangement can be used in combination with an electrical lighting system, e.g., wherein a photosensitive element can be used to turn off the latter when the solar powered device is operational.

Since the system of this invention utilizes as one of its primary features the concentration of solar energy, it offers the possibility of high temperature applications. In conventional flat plate collectors, no concentration is involved. Accordingly, the maximum temperature which can be attained by the water or other fluid which is circulating therein is limited. In other limited concentration devices, e.g., parabolic reflectors surrounding lengths of tubing, there still remains the drawback that the circulating fluid must be brought to the point of concentration of the solar energy. In other systems wherein mirrors are used to collect and concentrate solar power at a focal point in a central tower, significant disadvantages also exist, e.g., those imposed by the geometrical restraints. However, in the system of this invention, the requirements of solar collection and concentration are made essentially independent of those for the utilization of the concentrated solar power per se.

Accordingly, a large solar power plant may be constructed by transmitting the necessary amount of solar radiation via a collector/concentrator/collimator in conjunction with the described transmitters of this invention. All of the collected energy can be transmitted to a common water (or other fluid) heater to produce, e.g., steam which in turn can be used to produce motive power or electricity by moving a turbine or steam engine.

Using the same principle, for example, a solar vehicle can be constructed. For example, in many farm locations, tractors and the like are employed primarily during daytime and in areas and climates where the sun is a very strong source of energy. Assuming that such vehicles might have exterior surfaces covering about 20 m$^2$, the collection of solar energy in accordance with this invention over such an area and transmission of the same via the transmitters described above to a boiler could produce several kilowatts of steady power. This should be sufficient for many farm applications, as well as other conventional vehicular uses. Higher powers, of course, can be attained by collecting over larger surface areas. Such vehicles are advantageous with respect to the presently available solar vehicles which are based on photovoltaic conversion devices. The latter are of notoriously low efficiency and are also very expensive.

Of course, using the above principles, there can be constructed any of a number of smaller power plants 21 which can be used, e.g., for steam generation to move a steam engine or a turbine and provide power for refrigerators, pumping devices, drying devices, etc. (FIG. 5d). It is also possible, e.g., for agricultural purposes wherein much sunshine is available, to fabricate a mobile power plant using these principles. Electricity thus generated could be conventionally transferred to electrically powered farm equipment. This will, e.g., avoid the necessity of incorporating the devices of this invention on the vehicles per se with the attendant need to provide sufficient power to carry this additional weight. Such mobile power plants could be readily fabricated with quite large collector areas, e.g., which could be unfolded and/or assembled at a given site. The thus-generated electricity could be used for the myriad of imaginable farm uses, including transportation, pumping for irrigation, etc.

As can be seen from the foregoing, the various devices of this invention provide therefore unrealized advantages in the field of solar energy. They are less expensive to incorporate into existing structures and are more efficient than presently available systems, i.e., they enable utilization of more energy per unit area of the collector. The efficiency and simplicity is so great that heretofore impractical uses of solar energy, e.g., home cooking, small power plants, etc. are realizable. As mentioned, this system also enables the elimination of the additional pumping required in fluid circulating systems. Instead, the solar radiation can be fed directly into existing devices such as water heaters. Accordingly, the inherent costs, dangers and problems of such additional plumbing are also eliminated. Since the system of this invention is also useful during cold winter days as long as the sun is shining, it is also advantageous over such conventional fluid systems which require the use of low freezing point systems for winter operation (and attendant heat exchange means) to avoid the otherwise necessary draining of water from the system to avoid freezing. Thus, during the winter period of peak electricity demands for heating needs, the system of this invention is still useful. Moreover, when the energy is directly utilized, e.g., in a water heater, the need for a heat exchanger is eliminated.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

In order to illustrate, in a non-limiting manner, the device and system of this invention, the roles of the several system and/or device design parameters involved in their operation can be ascertained by study of the following exemplary systems.

These various design parameters affect both the amount of the energy finally collected at the heat sink (use device) and its spectral composition. This can be seen as follows. $So(\lambda)$ is the spectral distribution of the incoming radiant energy, i.e., before it undergoes any reflections in the system of this invention. Correspondingly, $Si(\lambda)$ is the spectrum of the same beam after it suffers i reflections in the system. $Si(\lambda)$ will differ from $So(\lambda)$ both in its absolute value and spectral composition.

$R(\lambda)$ is the reflection coefficient of the surfaces in the system. (In these examples, the well-known reflectivities of aluminum and silver are used.)

Accordingly, $$Si(\lambda) = So(\lambda) \cdot R^i(\lambda) \tag{1}$$

The absolute value of the energy which remains in the spectrum after n reflections will be given by $$P_n = \int_o^\infty Sn(\lambda)d\lambda = \int_o^\infty So(\lambda) \cdot R^n(\lambda) \cdot d\lambda \tag{2}$$

g is defined as a coefficient of collimation and collection. It represents the quality of the equipment in terms of smoothness, degree of concentration of the beam and ability to direct the radiant energy, etc. g is taken as independent of wavelength and has values equal to or less than 1. Thus, an amount of radiant energy $(1-g)So(\lambda)$ is lost before it is collimated. Practical values of g will be in the range of 0.95–0.98. However, the relative results shown below are not affected by the value of g since this parameter is simply a scalar quantity in this formulism.

f is defined as the fraction of collected energy which is well collimated, i.e., which reaches the heat sink after undergoing n reflections, n being the number of bends built into the transmitter. The remaining fraction $(1-f)$ is not well collimated, and is taken as forming an angle $\theta$ with the geometrical axis of the transmitter. It reaches the heat sink after a total number of reflections m. m is given by the following expression $$m = n + \frac{L}{d} \tan\theta \quad (3)$$

The total energy which will reach the heat sink is $$E = g \cdot \left[ f \cdot \int_0^\infty S_o(\lambda) \cdot R^n(\lambda) d\lambda + (1-f) \cdot \int_0^\infty S_o(\lambda) \cdot R^m(\lambda) \cdot d\lambda \right] \quad (4)$$

which may be represented as $$E = g \cdot (f \cdot P_n + (1-f) P_m) \quad (5)$$

Figure 2:
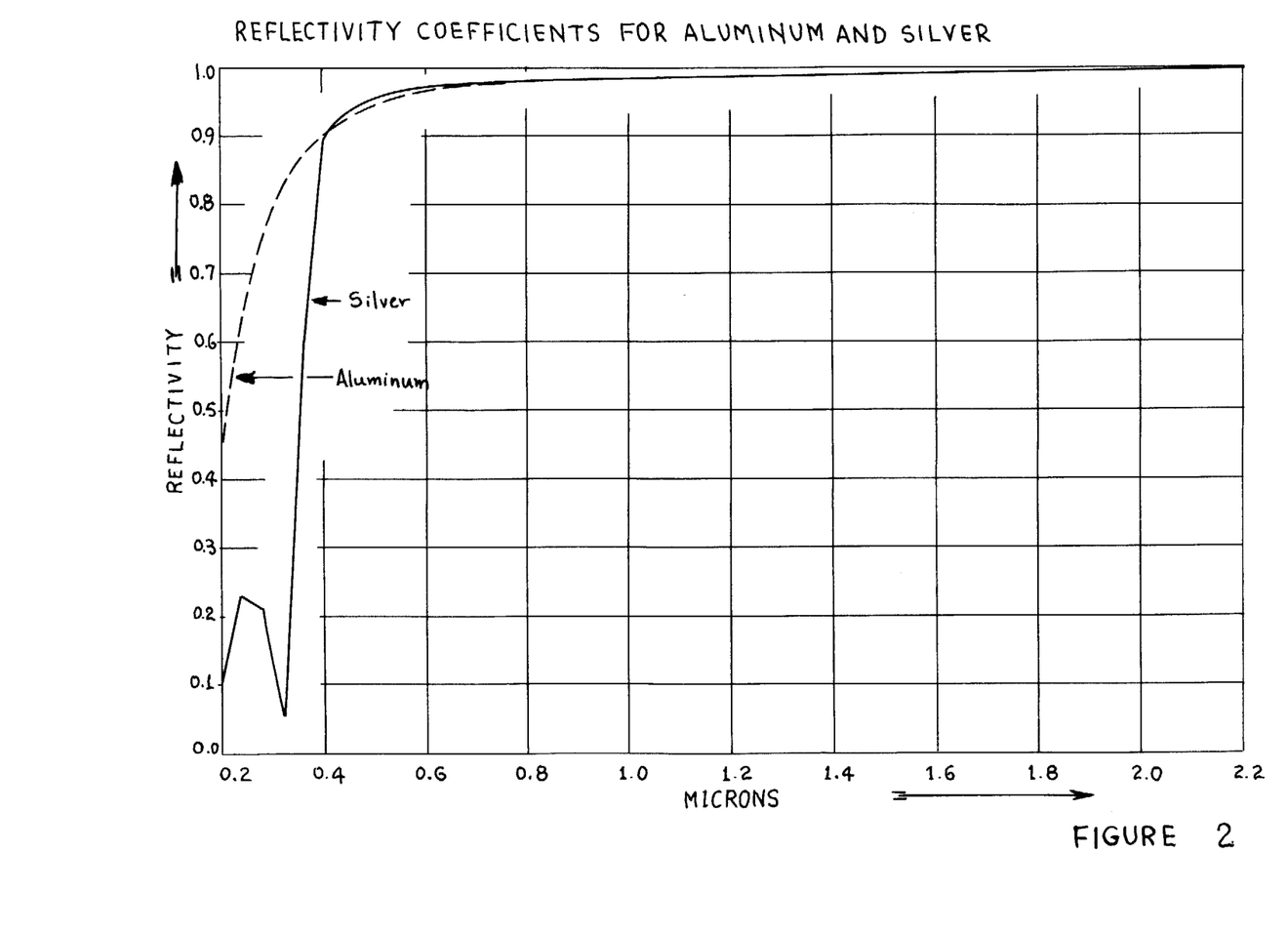
FIG. 2 shows the spectral reflectivities of Ag and Al.
Figure 3:
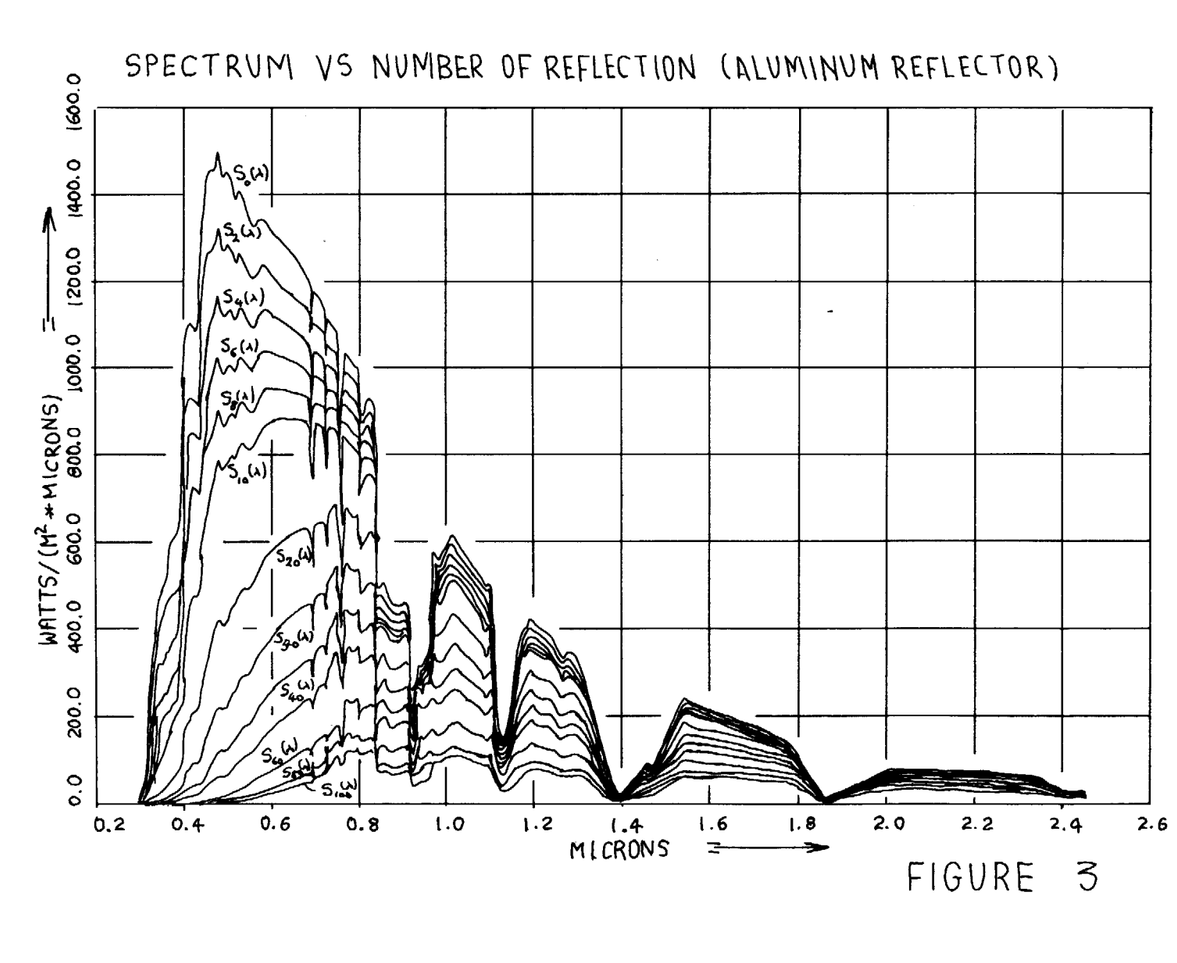
FIG. 3 depicts the relationship between the solar spectrum being transmitted and the number of reflections undergone by the transmitted beam.

In the following, g is fixed at the conservative value of 0.90 and n=7 which is a reasonable and practical value. As a reference case which is reasonable and conservative, the following values are further taken: f=0.60, L=700 cm, d=4 cm and $\theta$=10° (tan $\theta$=0.1763), giving a reference value of m=38. The unreflected spectrum of the sun, $S_o(\lambda)$ (see FIG. 3), is taken from Principles of Solar Engineering, by F. Kreith and J. Kreider, McGraw-Hill Book Company, New York (1978) and the spectral reflection coefficient $(R(\lambda))$ for Al and Ag (see FIG. 2) from F. A. Jenkins and E. White, *Fundamentals of Optics*, 4th Edition, McGraw-Hill, New York (1976). The actual incident radiation in practice, of course, will depend on many factors, such as the time of year, time of day, conditions in the atmosphere, etc. The spectrum $(S_o(\lambda))$ of FIG. 3 represents the maximum possible direct radiant energy. It does not include the diffuse radiant energy which under some atmospheric conditions could be significant or the mentioned local effects. However, assuming that the spectral composition does not change significantly, these factors are readily accounted for by the scalar g. Hence, as mentioned, the expression (5) is valid under any conditions to illustrate relative effects due to various design parameters.

Figure 4:
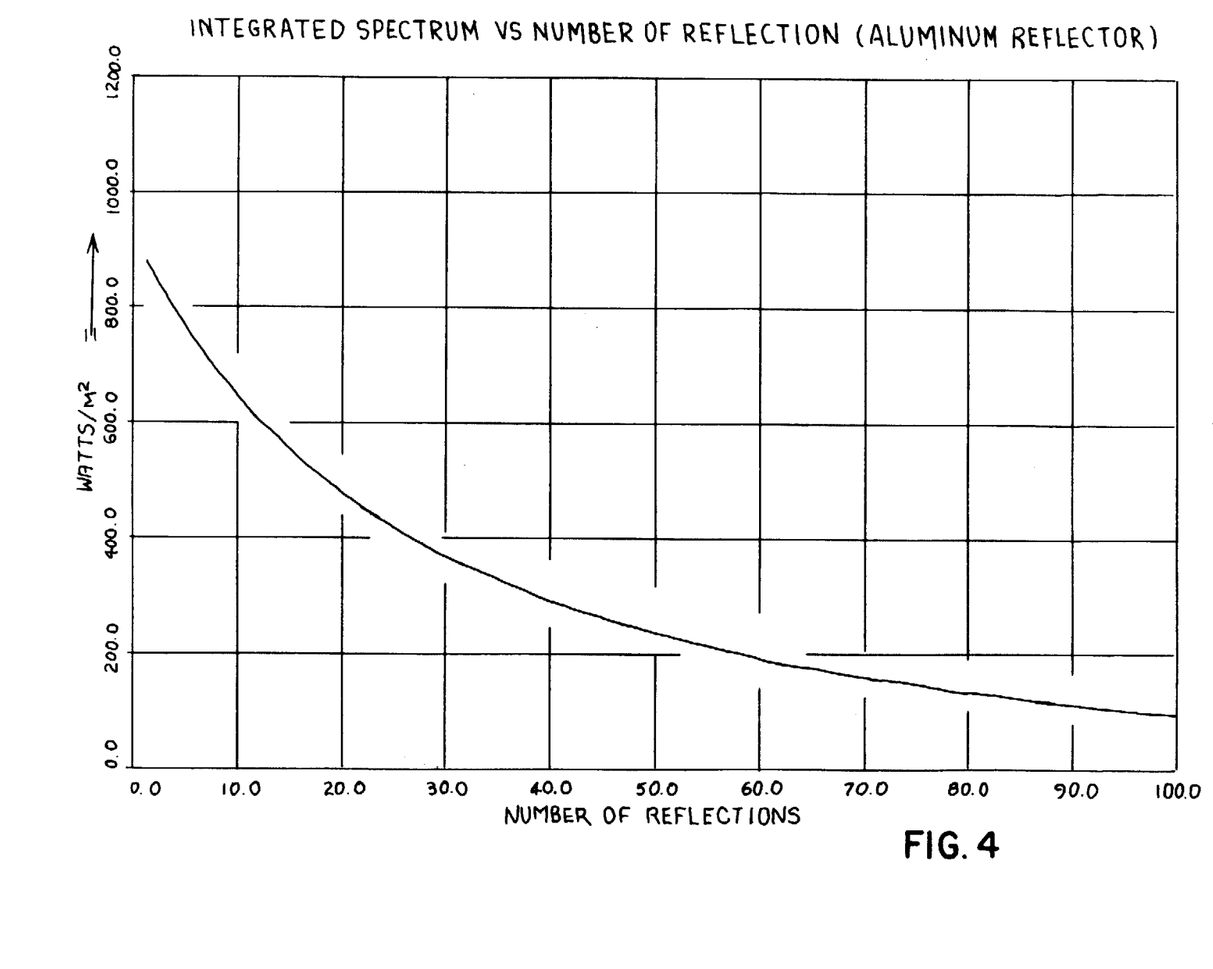
FIG. 4 shows the power transmitted by the system of this invention as a function of the number of reflections.

FIG. 3 dramatically illustrates how the spectral composition of the radiation changes upon sequential reflections. (These curves are for aluminum surfaces. Very similar results are obtained for Ag surfaces, the details varying in accordance with differences in $R(\lambda)$.) As is expected from the curves of $R(\lambda)$ and $S_o(\lambda)$, the lower wavelengths are absorbed much faster. In FIG. 3, each curve has the number of reflections m noted on it. The integral under each curve is the energy (Pi) carried after the corresponding number of reflections i. In FIG. 4, this is plotted vs. the number of reflections for Al. Using the latter values, collected energies for any combination of parameters can be calculated from equation (5). For the reference system defined above, $E_r$=0.90·(0.60×$P_7$+0.4×$P_{38}$)=0.90(0.60×691+0.4×307.3)=415 watts/m², assuming Po=889 watts/m².

Using the same equation, the variation of E as a function of f for the reference system is shown in Table 2.

TABLE 2

| f | 1-f | E(w/m²) |
|---|---|---|
| .3 | .7 | 380 |
| .4 | .6 | 415 |

TABLE 2-continued

| f | 1-f | E(w/m²) |
|---|---|---|
| .5 | .5 | 449 |
| .6 | .4 | 484 |
| .7 | .3 | 518 |
| .8 | .2 | 553 |
| .9 | .1 | 587 |

The variation of E with changing d for the reference system is shown in Table 3 (E=0.9·(0.6·Pn+0.4·Pm) where m=n+L/d tan $\theta$.).

TABLE 3

| d(cm) | E(w/m²) |
|---|---|
| 2 | 432 |
| 3 | 462 |
| 4 | 484 |
| 5 | 500 |
| 6 | 513 |
| 7 | 524 |
| 8 | 537 |
| 9 | 541 |
| 10 | 551 |

The variation of E with changing $\theta$ for the reference system is shown in Table 4, using the same formulae:

TABLE 4

| $\theta$° | E(w/m²) |
|---|---|
| 4 | 551 |
| 6 | 524 |
| 8 | 500 |
| 10 | 481 |
| 12 | 470 |
| 20 | 457 |

The variation of E with L for the reference system is shown in Table 5, using the same formulae.

TABLE 5

| m | L(m) | E(w/m²) |
|---|---|---|
| 25 | 4.00 | 524 |
| 35 | 6.35 | 492 |
| 45 | 8.62 | 468 |
| 55 | 10.89 | 450 |
| 65 | 13.14 | 437 |
| 75 | 15.43 | 426 |
| 85 | 17.70 | 418 |
| 95 | 20.00 | 411 |

The foregoing data illustrate that the basic system of this invention is readily capable of transmitting sufficient solar radiation to power many conventional energy utilization devices. However, it also demonstrates that significant losses can be encountered if the system design is improper or misaligned, e.g., $\theta$ significantly increased by optical misadjustments. In general, the several parameters considered above, over the range of values tested, cause power variations of about 20–30% as can be seen from the foregoing tables. The especially high sensitivity of the system performance to even small optical misalignment, particularly transmitter misalignment, is further demonstrated below.

For the reference case, again conservatively, it may be considered that the beam diameter is 0.5 cm smaller than the inner tube diameter d, i.e., the spacing $\delta$ between the outer edge of the collimated portion of the beam and the walls is 0.25 cm throughout the optical path. This well collimated part of the beam can be defined as that part which does not suffer a reflection over the entire length of the transmitter. Then, the minimum angle of deviation $\theta$ of the beam from the optical axis of the transmitter by which all of the collimated portion of the beam will suffer at least one wall reflection is:

$$\tan\theta = \frac{d-\delta}{L} = \frac{4-0.25}{700} = .005357$$

Hence $\theta = 0.31° = 18'$. This means that if the alignment of the transmitter is off by even the very small angle of 18', no part of the beam will reach the heat sink without an additional, non-designed wall reflection.

By a similar calculation, the minimum angle at which at least some part of the collimated beam will undergo a wall reflection is $0.02° = 1.2'$, indeed a very small angle. Thus, even in the range of very small angular deviations, e.g., 1.2–18', at least some of the beam will be partly reflected from the wall, demonstrating the criticality of the alignment to proper system performance, i.e., minimal energy loss.

The stringent nature of the above requirement can be appreciated by considering the misalignment of two adjacent modules of the transmitter which corresponds to the above-derived angles. In this case, the distance $\delta'$ is the linear distance between a point at the junction of two transmitter modules when the system is aligned and the same point when the system is misaligned. Assuming a typical practical module length of 1 m, and again using the relation $\delta' = L \tan \theta$, the angle of misalignment between the two components at which all of the collimated portion of the beam will undergo at least one wall reflection is again a very small value, i.e., $0.14° = 8.6'$. Thus, for even very slight misalignments of two consecutive modular components, the effects on the transmission of the beam are relatively enormous, i.e., for only a very small deviation of 8.6', the entire beam will be reflected from the wall over the length of only the two components. Thus, for a practical length of around 7 m, as assumed above, for only this one quite small misalignment, all of the beam will undergo 3–4 additional reflections.

Of course, in practice, numerous misalignments of significantly greater than the illustrative 8.6' value can easily be encountered. Moreover, in practice, it is likely that values smaller than the assumed d and $\delta$ will be employed due to the desire to minimize system size and maximize system efficiency. Accordingly, it is evident that, in practice, unless proper system alignment is assured, it is quite likely that tens of additional reflections of even the collimated portion of the beam will be caused. That this will have a very large, and for the larger number of additional reflections, even disastrous effects on system performance, can be readily appreciated by reference to FIGS. 3 and 4 which demonstrates the cumulative loss of solar energy as the number of reflections is increased. Very significantly, the rate of loss of power as a function of the number of reflections is greatest for the first few reflections (see FIGS. 3 and 4). Accordingly, even misalignments which cause an additional number of reflections on the order of 10 or less will have very deleterious impact upon the power which eventually reaches the heat sink.

The foregoing analysis quite clearly demonstrates the stringent requirements on system alignment in order to ensure that sufficient solar energy reaches the end use device. Heretofore, the nature of these requirements was not appreciated by the prior art. As a result, the desirability and even necessity of utilizing the transmitter of this invention and/or the solar energy system of this invention were not realized.

Similarly, heretofore, the high desirability of certain design modifications due to the potential temperature rise which will occur in the transmitter due to absorption of the solar energy propagating therein has not been realized. In order to determine the potential impact of this effect, the following may be considered.

As already noted, the absolute value of energy loss per reflection is much higher for the first few reflections than for the later ones (see FIGS. 3 and 4). Thus, the rate of energy loss per unit length of the transmitter is higher at its beginning than at its end since the first reflections, of course, occur there. This is due to the fact that, while the rate of loss for each part of the spectrum (reflection coefficient) is constant, the energy available is higher in the first reflections. As can be seen, most of the energy absorbed during the first few reflections comes from the smaller wavelengths of the spectrum and the visible region. Thus, this part diminishes fastest.

For the reference case there are 31 reflections distributed equidistantly over the 700 cm of the transmitter. Consider the first 1 m segment (module) of the transmitter. From the above, it is obvious that this segment will have the highest temperature rise, $\Delta t$. The number of reflections in this module is 4.4. The total energy loss here will be: $g \cdot (1-f) \cdot (P_1 - P_{4.4})$, i.e., 28.0 watts. Now, the heat dissipation coefficient for a vertical pipe with natural convection, which is the most conservative case, from McAdams, *Heat Transmission*, McGraw Hill Book Co., N.Y. (1933) p. 244, is, $$h_c = 0.4(\Delta t/D')^{0.25}$$

where $h_c$ is in BTU/hr.ft$^2$.°F. D' is the pipe outside diameter in inches. For the reference case 4 cm inside diameter pipe, a reasonable outside diameter is 2 inches = 5.08 cm. From this, $\Delta t$ can be determined as that value for which $h_c(\Delta t)$ and $\Delta t$ satisfy the following fundamental relationship $$A \cdot h_c(\Delta t) \cdot \Delta t = \text{heat input}$$

wherein the heat input is 28.0 watts and A is the outside area of the tube (1.72 ft$^2$). The resultant expected rise of temperature in the first segment is about 60° F. as a maximum for the reference case. While this temperature rise is not prohibitive, nevertheless, it should be accounted for in the system. This is especially true since a practical system may conceivably involve greater losses than those assumed here, e.g., a higher $\Delta t$ due to smaller transmitter diameter, higher collector areas, higher values of $(1-f)$, i.e., the uncollimated part of the beam, higher values of the angle $\theta$ etc.

These temperature rises can be accounted for in several ways by, e.g., incorporating means for minimizing such temperature rises, e.g., by increasing conduction, or incorporating means to accomodate the effects of the temperature rise. One remedy is to provide the outside of the transmitter tube with longitudinally parallel fins 13 which will increase the heat dissipation area and hence keep the effective $\Delta t$ smaller (FIG. 5a). Also, a filter can be disposed around the inlet of the transmitter to remove the shorter wavelengths of the spectrum before they enter the transmitter in the first place. This will greatly minimize $\Delta t$ since these are the most strongly absorbed. Furthermore, the shorter part of the uncollimated spectrum will be significantly diminished before it gets to the heat sink anyway. It is not necessary to filter all of the short radiation. A portion sufficient to ease the thermal load on the transmitter need only be removed. Of course, the best tactic is to improve the collimation to the point that the resultant thermal loss is less than the highest which can be readily accepted by the system.

It is also possible to accomodate the temperature rise, e.g., by providing a clearance between the modules which constitute the transmitter so that the thermal expansion caused by $\Delta t$ can be accommodated without throwing the transmitter out of alignment. As shown above, even very small relocations can result in misalignment and attendant significant energy loss. Considering the heat expansion coefficient for aluminum ($\alpha = 20 \times 10^{-6} \Delta 1/1°$ C.) (which is one of the highest expansion coefficients for metals), for an 60° F. rise, $\Delta 1 = \approx 0.7$ mm, an expansion which can be readily accommodated by fully conventional expansion joints 14 which maintain wall continuity, smoothness, reflectivity and alignment (FIG. 5a).

Of course, these measures are most significant for the first or first few modules since $\Delta t$ will by far be greater there. Thus, it will also be advantageous to thermally insulate this module(s) from the subsequent modules. Of course, if necessary, for any particular design, various conventional active cooling methods may be used to cool the modules, e.g., water or other fluid jackets 22, with associated inlet and outlet means 23 as conventional (FIG. 5e). Again, these would be most necessary for the first or first few modules.

The preceding examples can be repeated with similar success by substituting the generically or specifically described components and/or operating conditions of this invention for those used above.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A transmission device for transmitting a beam of collimated solar energy from a solar energy collector/concentrator/collimator to an associated solar energy use or storage device, said beam having a propagation axis defined by the line formed by the center of said beam along its direction of travel, said transmission device comprising:
a plurality of modular, interconnected solar energy transmission tubes, said plurality of tubes having a transmission axis defined by the interconnection of the longitudinal axes of said tubes,
each tube having walls smooth and highly reflective to solar radiation,
at least one tube being an angled tube wherein the walls thereof form an angle at at least one position thereof whereby the longitudinal axis of said angled tube is changed in direction by the same angle at said position; and said angled tube having an interior beam diverting means, located inside at said position, whereby the direction of radiation propagating along the longitudinal axis of said angled tube is changed by said angle at said position,
each non-angled tube having an alignment sight disposed on its exterior at each end such that a line drawn through the center of said sights will be parallel to the longitudinal axis of said tube, and each angled tube having an alignment sight disposed on its exterior at each end and also having an external beam diverting means disposed on its exterior at the position of said angle such that light propagating parallel to the longitudinal axis of one side of said angled tube and passing through the sight disposed on the end of the same side will be diverted at said external beam diverting means to propagate along a direction parallel to the longitudinal axis of the other side of said angled tube and pass through the sight disposed at the end of said other side; said sights providing means by which said transmission axis of said plurality of tubes can be aligned to essentially coincide with said beam propagation axis
wherein at least one of said modular tubes is provided with longitudinally parallel, exterior fins by which heat is dissipated from said tube.

2. The transmission device of claim 1, which is aligned such that the transmission axis of said plurality of tubes essentially coincides with said beam propagation axis.

3. The transmission device of claim 1, wherein the walls of said tubes have aluminum or silver surfaces.

4. The transmission device of claim 1, wherein said internal and external beam diverting means are mirrors.

5. The transmission device of claim 1, wherein the first modular tube is provided with said exterior fins.

6. The transmission device of claim 1, wherein at least one pair of adjacent modular tubes are connected by an expansion joint.

7. The transmission device of claim 1 further comprising a modular, solar energy transmission tube having a mirror mounted therein, the mirror being rotatable into a position in which its surface is perpendicular to the incoming beam whereby said beam is essentially completely blocked, or in which its surface is parallel to the incoming beam whereby the beam is transmitted through said tube.

8. The solar energy system of claim 7, wherein said solar energy use or storage device is a solar power plant.

9. The transmission device of claim 1, wherein at least one of said modular tubes is surrounded by an enveloping-jacket thereby forming an enclosed region around the outside of said tube, said jacket having inlet and outlet means for the entry and exit of a cooling fluid to and from said enclosed region, whereby in operation, said fluid will convey heat from said modular tube.

10. A solar energy system comprising:
a solar energy collector;
a concentrator for concentrating the solar energy collected by said solar collector;
a collimator for collimating the solar energy collected by said solar collector;
a transmission device by which solar energy collected, concentrated and collimated by said collector, concentrator and collimator is efficiently transmitted to a solar energy use or storage device; and
a solar energy use or storage device;
wherein said transmission device is for transmitting a beam of collimated solar energy from a solar energy collector/concentrator/collimator to an associated solar energy use or storage device, said beam has a propagation axis defined by the line formed by the center of said beam along its direction of travel; and
said transmission device comprises:
a plurality of modular, interconnected solar energy transmission tubes, said plurality of tubes having a transmission axis defined by the interconnection of the longitudinal axes of said tubes, each tube having walls smooth and highly reflective to solar radiation, at least one tube being an angled tube wherein the walls thereof form an angle at at least one position thereof whereby the longitudinal axis of said angled tube is changed in direction by the same angle at said position; and said angled tube having an interior beam diverting means, located inside at said position, whereby the direction of radiation propagating along the longitudinal axis of said angled tube is changed by said angle at said position, and each non-angled tube having an alignment sight disposed on its exterior at each end such that a line drawn through the center of said sights will be parallel to the longitudinal axis of said tube, and each angled tube having an alignment sight disposed on its exterior at each end and also having an external beam diverting means disposed on its exterior at the position of said angle such that light propagating parallel to the longitudinal axis of one side of said angled tube and passing through the sight disposed on the end of the same side will be diverted at said external beam diverting means to propagate along a direction parallel to the longitudinal axis of the other side of said angled tube and pass through the sight disposed at the end of said other side; said sights providing means by which said transmission axis of said plurality of tubes can be aligned to essentially coincide with said beam propagation axis;

said transmission device being aligned such that the transmission axis of said plurality of tubes essentially coincides with said beam propagation axis.

11. The solar energy system of claim 10, wherein said solar energy use or storage device is a solar water heater.

12. The solar energy system of claim 11, wherein the solar water heater has incorporated therein a non-solar operated, second heating unit in addition to the first solar-energized, heating unit, both heating units being controlled by control means activated by water temperature.

13. The solar energy system of claim 10, wherein said solar energy use or storage device is a solar stove.

14. The solar energy system of claim 13, wherein said solar energy use or storage device is a metallic cavity of high absorbance to solar radiation open only at one portion to permit the entry of the transmitted solar radiation, and insulated on all exterior sides except the top, whereby the collected solar energy is concentrated at said top providing a concentrated source of heat suitable for cooking.

15. The solar energy system of claim 14 further comprising a non-solar operated, second heating unit disposed over said first heating unit.

16. The solar energy system of claim 10, further comprising a visible laser to provide an alignment beam of light for aligning said system in conjunction with said alignment sights.

17. A method of transmitting solar energy from a point at which it has been collected, concentrated and collimated to a point at which it is to be utilized, which comprises transmitting said collected, concentrated and collimated energy via a plurality of modular, inter-connected solar energy transmission tubes, each tube having walls smooth and highly reflective to solar radiation, each tube having alignment sights disposed thereon which facilitate the alignment of the tubes and wherein at least one of said modular tubes is provided with longitudinally parallel, exterior fins by which heat is dissipated from said tube.

* * * * *